May 14, 1957 R. A. BARBEAU ET AL 2,792,222

REGISTRATION DEVICE FOR RECORD CARD PUNCHING MACHINE

Filed Dec. 21, 1953 2 Sheets-Sheet. 1

INVENTOR.
RAYMOND A. BARBEAU
& HENRY A. DI MARCO

BY

Kenyon & Kenyon
ATTORNEYS

REGISTRATION DEVICE FOR RECORD CARD PUNCHING MACHINE

Filed Dec. 21, 1953 2 Sheets-Sheet 2

INVENTOR.
RAYMOND A. BARBEAU
& HENRY A. DI MARCO
BY
Kenyon & Kenyon
ATTORNEYS

United States Patent Office 2,792,222

Patented May 14, 1957

2,792,222

REGISTRATION DEVICE FOR RECORD CARD PUNCHING MACHINE

Raymond A. Barbeau, Poughkeepsie, and Henry A. Di Marco, Wappingers Falls, N. Y., assignors to International Business Machines Corporation, New York, N. Y., a corporation of New York Application December 21, 1953, Serial No. 399,374

10 Claims. (Cl. 271—55)

The present invention relates to record card punching machines and more particularly to a card registration device for use in such machines to provide for appropriate alignment of the cards with respect to a punching station of the machine.

The card registration device or aligning means of this invention is intended for use in card punching machines in which record cards are fed one at a time and column by column past a line of punches at a punching station. The punches are actuated either by operation of a manual keyboard or by punch instructing pulses derived from the automatic sensing of a master tape containing coded punching instructions. The actuation of the punches in either of these two ways punches information into appropriate rows and columns of successive cards. This information is usually in binary code form and is stored in the form of punch holes in the cards for subsequent use.

In the preparation of a master tape for use in record card punching machines of the character just described, errors are sometimes made in the recording of coded instructions on the master tape. In order to avoid the necessity of reversing the travel of the master tape during recording thereon to eliminate such errors, a characteristic error indicating signal is impressed or written on the tape immediately following the occurrence of such a recording error.

Card punching machines of the kind in question are equipped with error signal detecting means that are utilized when error signal containing master tapes are employed for operating the punches by running such master tapes through appropriate sensing means that translate the tape recorded information into punch operating impulses. The error signal detecting means is located in advance of the sensing means of the machine. Thus it is apparent that the error signal containing master tape must be fed in reverse direction to the sensing means of the card punching machine in order to have the error signal on the tape presented to the error detecting means before the portion on the tape containing the error reaches the sensing means. By providing such reverse feed of the master tape, the error in the reversely advancing master tape is read by the detecting means before it reaches the sensing means and such detecting means actuates appropriate controls that prevent erroneous operation of the punching means.

Since the recorded information on the reversely moving master tape is presented in reverse sequence to the sensing means in the machine, i. e. since its recorded information is read in reverse sequence by the sensing means of the machine, the record cards to be punched by master tape instructions must be presented to the line of punches at the machine punching station in a reversed position relative to their usual position of presentation which is that occurring when punching is effected by manual keyboard control.

The record cards which are fed through the punching machine are generally oblong in shape and have a plurality of sequentially numbered columns that are parallel with the shorter end edges of the card. In normal manual keyboard controlled punching of such cards, the cards are presented successively to the punching station each with its shorter edge near its column numbered 1 in the lead. These cards are advanced column by column past the punching station in the machine from their lowest numbered to their highest numbered columns.

When master tape control of punching of these record cards is employed, they must be fed to the punching station in reversed position so that their shorter edges adjacent their highest numbered columns are in the lead. This reverse feed position of the cards is obtained by turning over the cards by rotating each card 180° about an axis in the plane of the card parallel with the shorter edges of the cards.

It is of great importance in a record card punching machine to align or register carefully each individual card in a determined position immediately before it is presented to the line of punches at the punching station to insure that the information will be punched into the proper locations on the card as it thereafter progresses column by column past the punches at the punching station. Since the overall card length will vary due to atmospheric changes, record cards are always registered or aligned from the same particular end to guarantee accuracy in the punching of the cards and of information punched into the cards. It is at once apparent that for a card punching machine providing the above mentioned error detecting means which requires reverse card feed when in use, record card registration or alignment means must be available which will align the cards when operating with manual keyboard control, and which also will align the cards when using a master tape control in which the tape moves in a reverse sequence.

To further explain, during manual keyboard punching or normal feed, the record card about to be punched is positioned in relation to the line of punches by locating action on the then trailing edge of the card, that is, the end of the card farthest from the line of punches, by advancing the card to a fixed distance from the punching station. On the other hand, when the card is fed in a reversed position to the punches (when a master tape controls punching), that which was the trailing edge of the card for normal feed now becomes the leading edge for reverse feed. In the latter event the positioning of the card with respect to the line of punches must be accomplished by locating this present leading edge a separate fixed distance from the punches just before the start of the punching operation.

Principal objects and features of the present invention are first to provide means for registration or alignment of a record card in proper positional relationship to the punching station in a record card punching machine, immediately before the card is to be fed past the punches at said station, when the cards are being fed in a normal manner, that is when controlling the action of the punches either from a manual keyboard or from a master tape being automatically sensed in a normal chronological sequence; and, secondly, to provide means for registration or alignment of record cards with respect to the punches when using a reverse feed, that is when using a master tape and feeding it backwards to permit operation of the tape error detecting means of the machine which necessitates feeding the record cards to the line of punches in a reverse manner as above described.

Other objects and features of this invention are to provide registration means in a record card punching machine which can be set quickly and easily to accomplish either normal or reverse card registration as required.

Other objects and features of the present invention are to provide a normal card feed and a reverse card feed registration means, which can be alternately selected by the shifting of one mechanical linkage, for alignment of record cards being fed to the punches either in a normal manner or in a reverse manner, respectively.

Other objects and features of the invention will become apparent from the following specification and the accompanying drawings which disclose by way of example the principle of the invention and one mode which has been contemplated of applying that principle.

For purposes of the following description "normal registration" will designate that mode of card alignment in the machine used when operating its punches with manual keyboard punch control, and "reverse registration" will designate the mode of card alignment in the machine used when using reversely-fed master tape punch control in conjunction with error detecting means.

This invention is particularly adaptable for use in card punching machines having the same general arrangement of card feeding and card punching components described in U. S. Patent No. 2,647,581 to Gardinor, et al., and more particularly shown in Fig. 13 of that patent.

Using the above mentioned general arrangement in conjunction with the present invention, each record card is separately fed from a supply hopper, in a direction parallel to its shorter axis along a definite path to an intermediate station where the registration device is located. The advance of the card to this station is concluded when the then leading longer edge of the card abuts against an appropriate means. When this occurs the card is properly positioned for further advance by the registration device in a direction parallel to the longitudinal axis of such card, and toward the punching station, until the then trailing or leading shorter card edge (depending on whether using normal or reverse registration) is located a definite distance (differing for the two types of registration) from the line of punches at the punching station which extends across the path of the card at right angles to the path of the advancing card. After such action by the registration device, the punches are actuated, and a step-by-step feeding means advances the card column by column past the punches. In the present embodiment the path of the card from the registration device to the punches is at right angles to the card path from the supply hopper to the registration device, but it is obvious that other arrangements of card paths could be provided for without departing from the essential operational features of the present registration device.

Figures 1, 2:
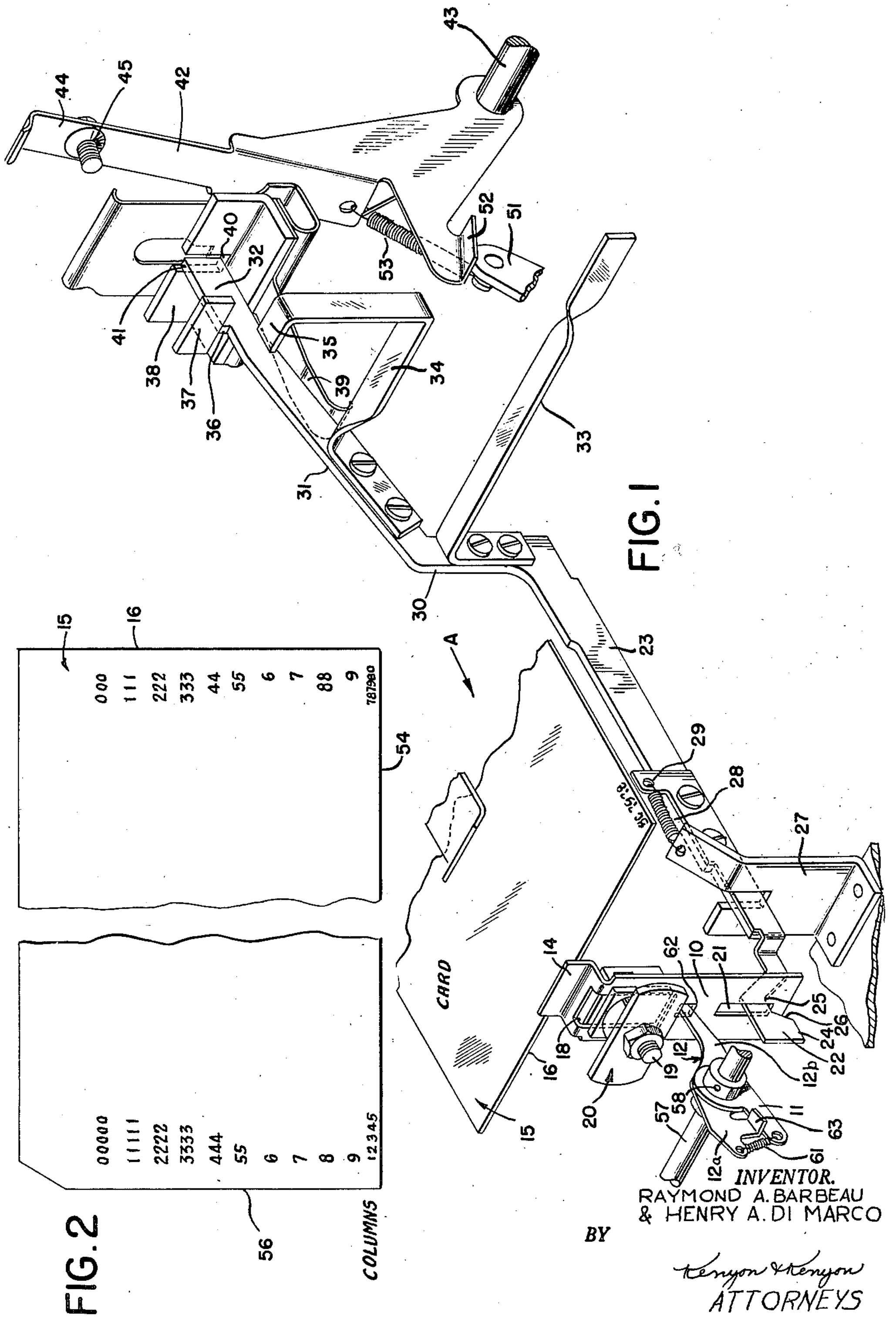
Fig. 1 is an isometric view of the card registration device embodying the invention.
Fig. 2 is a fragmentary plan view of a typical record card used in the punching machine and in which the numbering system for vertical columns and horizontal rows of the card are shown.
Figure 3:
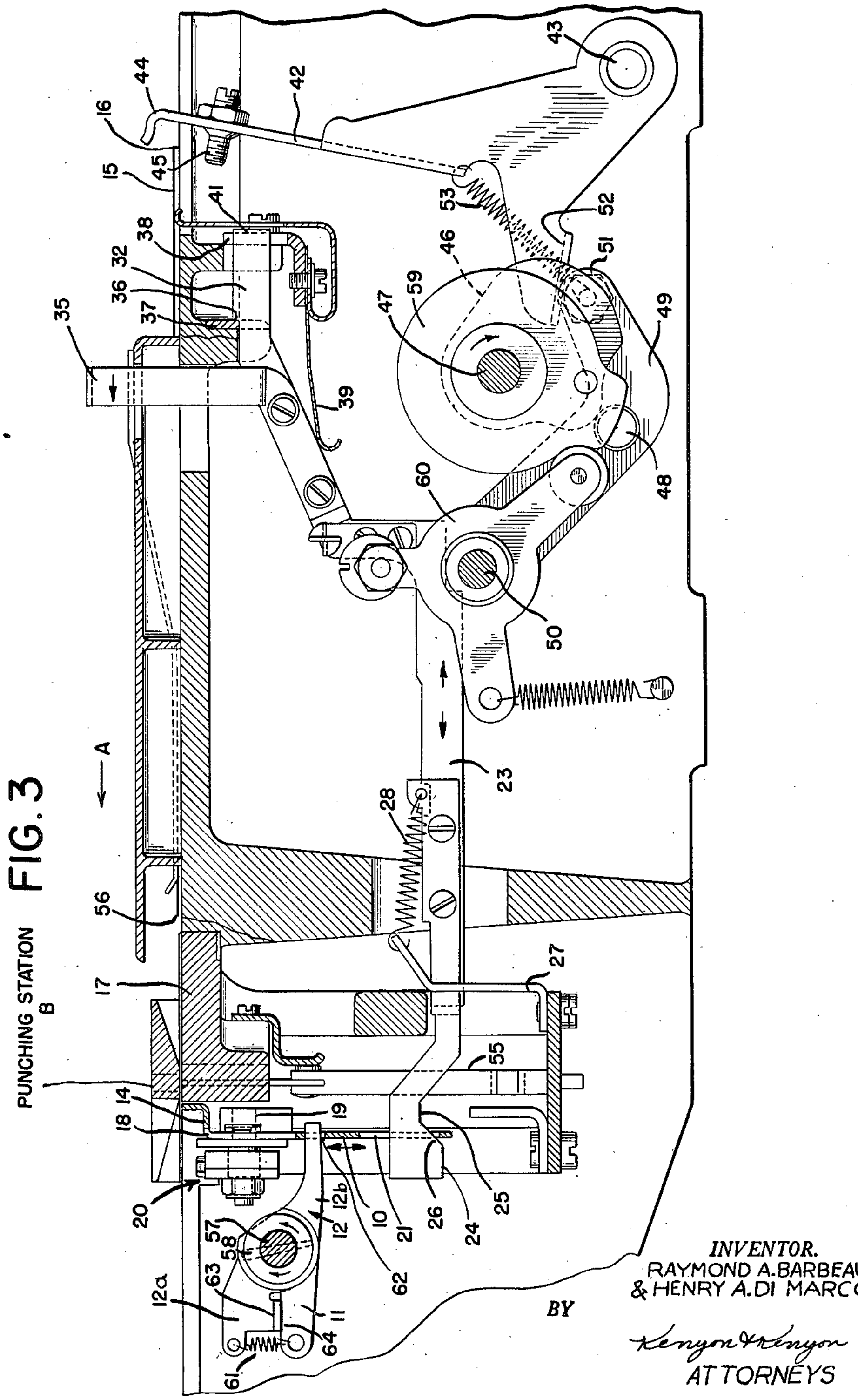
Fig. 3 is a partially sectionalized front elevation view of the registration device.

Referring to Fig. 1, the principal components of the card registration device of the instant invention are shown in the positions for reverse registration. At the extreme left of the mechanism as viewed in Fig. 1 is an upright member 10 called a reverse registration stop which is reciprocated or moved up and down in a vertical plane by the appropriate actuation of interrelated rock levers 11 and 12, further described below, so that once during each cycle of operation by the registration device, when using reverse card feed as mentioned above, the upper portion 14 of said member 10 will be moved up into the record card movement path, which is toward the left as shown by arrow A, to limit the forward motion of the record card 15 and determine the position of its leading end edge 16 (in this instance the edge adjacent the highest number column on the card) just before the punching operations begin at the punching station B (Fig. 3). The portion

14 of stop 10 thereafter will be moved down out of the record card movement path permitting punching to be carried out at the punching station as the record card is subsequently advanced step by step to the left by automatic advancing means (not shown). This advancing means for the cards may be the card advancing mechanisms described in the aforesaid Gardinor, et al. Patent No. 2,647,581 and shown in Fig. 13 thereof, controlled as described in said patent.

Registration stop 10 is slideably supported from a portion of the frame 17 of the punching machine by any well-known means and is capable of reciprocal vertical movement for purposes presently to be described. For example, the stop 10 has a longitudinally extending slot 18 through which a pin 19 extends. The pin 19 is carried by a guide 20 attached to the frame 17. The pin 19 and slot 18 guidedly support the stop 10 for vertical reciprocation relative to the guide 20. Other guiding means for the stop 10 may be substituted.

A second slot 21 is provided in the stop 10 below the slot 18. This slot 21 serves to receive an end 22 of a shiftable linkage bar 23. The end 22 of said linkage bar has a toe 24 and a recess 25 having a cam edge 26. When the bar 23 is shifted to the position shown in Fig. 1, the slot 21 cooperates with the recess 25 and permits the stop 10 to be moved upwardly to bring its portion 14 into the card engaging position in the path of travel of the card toward the punching station B. When the bar 23 is shifted longitudinally to the position shown in Fig. 3, the cam surface 26 acts against the lower end of slot 21 to move and maintain the stop 10 and its card engaging portion 14 in a lowered position out of the path of card travel. This action of cam surface 26 thereafter prevents the stop 10 from responding to the movement imparting action of the rock levers 11 and 12 until the bar 23 is returned to its Fig. 1 position.

To the right of the reverse registration stop 10 as viewed in Fig. 1, linkage bar 23 is carried in a slotted guiding and supporting bracket 27. A tension spring 28 connected between said bracket 27 and a part 29 of said linkage bar 23 biases the latter to the left, i. e. towards its position as seen in Fig. 1 wherein the stop 10 is free to respond to the reciprocatory action of the rock levers 11 and 12 and can assume its reverse registration position. In effect the spring 28 biases the linkage bar 23 to a release position relative to the stop 10.

The said linkage bar 23 has a short vertical section 30 in its length and then extends on toward the right in an upwardly inclined portion 31 and terminates in a short horizontal section 32. Extending laterally from and connected to the vertical section 30 is a shifting member or bar 33 which may be manually actuated by the operator to shift or move the linkage bar 23 from the reverse registration position as seen in Fig. 1 and into the normal registration position as seen in Fig. 3 where it is locked in position by the coaction of its shoulder 36 with catch 37. In the latter position, the stop 10 is locked by cam surface 26 in a lowered position and its portion 14 is maintained out of card abutting position.

A release member 34 is secured to the inclined portion 31 of the bar 23. This member 34 may be depressed manually by the machine operator by finger pressure on its flange 35 when it is desired to secure a shift of the linkage bar 23 from the normal registration position of Fig. 3 to the reverse registration position of Fig. 1 under action of spring 28. The release member 34 when depressed by the operator, acts to free the shoulder 36 on section 32 of the bar 23 from the fixed locking element or catch means 37 which is located in proximity to a slotted guide 38 for bar 23. The guide 38 is suitably supported from the machine frame 17 and cooperates with the guide 27 to permit guided longitudinal shifting movement of the linkage bar 23.

A leaf spring 39 secured to the guide 38 acts on the under side of the linkage bar 23 to bias it upwardly toward the locking element 37 so that the latter will automatically engage shoulder 36 whenever the linkage bar 23 is shifted to the position shown in Fig. 3 from its Fig. 1 position by hand manipulation of the shifting bar 33. When such engagement occurs the linkage bar 23 becomes locked in the position of Fig. 3. This locked condition is maintained until the release member 34 is depressed by the operator whereupon the spring 28 automatically shifts the linkage bar 23 to the Fig. 1 position.

The slot or recess 40 in guide 38 in which portion 32 of bar 23 rides provides lateral guiding action or stabilization for said portion 32 and also limits the extent downward motion of said horizontal portion 32 when release member 34 is depressed to effect shifting of the linkage bar 23 to the position of Fig. 1 for reverse card registration.

The extreme end 41 of linkage bar 23 provides a forward limit stop for an intermittently rocking card pusher 42 which is pivoted at 43. The upper end portion 44 of this lever 42 serves to move the record cards towards punching station B and into registration position. An adjustment screw 45, in the upper part of the card pusher 42, which is in abuttable position relative to the end 41 of linkage bar 23 when the card pusher 42 is in its forwardmost position serves to limit the extent of forward stroke of the card pusher 42 for purposes to be described.

The rocking operation of the card pusher 42 is effected by cam operated mechanisms similar to those described for operating the card pusher of the aforesaid Gardinor, et al, patent. In brief, properly timed rocking motion is imparted to said card pusher 42 by a cam 46, secured to a shaft 47 which is continuously rotatable in a clockwise direction, as seen in Fig. 3. Said cam 46 during its rotation engages a roller 48 carried by a lever 49 which is urged in a counterclockwise direction about a pivot 50 by a coil spring (not shown). The free end 51 of lever 49 engages a flange portion 52 of the card pusher 42 which is pivoted at 43. The flange portion 52 is urged against said free end 51 by a spring 53. Through this arrangement said card pusher 42 is caused to oscillate about its pivot 43 and its end 44 moves back and forth relative to the machine punching station B.

When the linkage bar 23 is set for normal registration, as shown in Fig. 3, registration is accomplished by the card pusher 42 alone, the reverse registration stop 10 being held inoperative and out of the card movement path as described above. As each record card is automatically fed from a card supply (not shown) to the registration device in a direction perpendicular to the direction of arrow A (see Fig. 1), by a means (not shown), for example, the means of said Gardinor, et al, patent, the card pusher 42 is rocked back away from the end 41 of linkage bar 23 and the card is advanced by the said last-named means so that its bottom edge 54 is properly aligned with the path of card travel to the punching station B and the edge 16 of the card which is farthest from the punches at said station B is in a position for engagement with portion 44 of the card pusher 42 when the latter is next rocked forwardly by action of cam 46.

The end 44 of the said pusher arm at the proper time engages the trailing edge 16 of the record card and pushes it in a direction parallel with the longitudinal axis of the card toward the punching station B until adjustment screw 45 abuts against surface 41 of the linkage bar 23. When this abutment occurs the record card 15 is properly located at a determined distance from said station B and as the card is subsequently fed column by column past the punching station by a card feed wheel (not shown) similar to the feed wheel of said patent, the punches 55 at said station similar to the punches of said patent and which extend in a line across the card movement path at said punching station as described in said patent, will perforate the desired areas on the card. After completing the registration of a card 15, the card pusher 42 is rocked back to the position of Fig. 3 and is ready to receive the next card. In this normal card registration, column 1 on the record card 15 (see Fig. 2) is presented to the punching station B first and is thus adjacent the leading edge 56 of said card, and the column 80 is adjacent trailing edge 16 of the card 15 which latter edge is the one pushed by the card pusher 42 when card registration is being effected.

When it is desired to feed the record card 15 in reverse registration condition which is that needed when the master tape and error detecting means (neither shown) are used, the operator depresses release member 34 by manual pressure on its flange 35, thereby disengaging shoulder 36 of linkage bar 23 from latched engagement with locking element 37, permitting spring 28 to shift the linkage 23 to the left as viewed in Fig. 1 to the position for reverse registration. When this occurs, cam surface 26 at end 24 of the linkage bar 23 moves away from the bottom edge of slot 21 in the reverse registration stop 10 and brings recess 25 into overlying position relative to said edge. As a result the latter stop 10 is now released and will operate under actuation of rock levers 11 and 12.

The cards 15 are fed from the supply (not shown) to the registration device in reversed condition as hereinbefore described so that column 80 and card edge 16 are in the lead and will be presented to the punching station B first (see Fig. 2). In other respects the manner of delivery of the cards into the position for engagement by the card pusher 42 for their subsequent movement toward the punching station B is the same as it would be for normal registration. However, just before the card pusher 42 begins pushing the card towards the punching station B by engagement with card end 56 the reverse registration stop 10 is moved upwardly into the card movement path by the combined actuation of rock levers 11 and 12 as will be hereinafter described.

It will be noted that since the linkage bar 23 has shifted slightly to the left as viewed in Fig. 3, after release member 34 was depressed, the card pusher 42 may and does move the same additional amount in the same direction which is toward punching station B before screw 45 abuts against the end 41 of the linkage bar 23. This additional movement insures complete abutment of the leading edge 16 of the record card 15 against the upper portion 14 of the reverse registration stop 10, thus locating the leading edge 16 of the card a fixed distance from said punching station. This fixed distance is different from that occurring during normal card registration wherein the abutment stop 10 is not in use and the pusher 42 is limited to a shorter feeding stroke by the engagement of screw 45 with the end 41 of linkage bar 23.

Up and down reciprocating motion is imparted to the reverse registration stop 10 by the action of rock levers 11 and 12 in a manner now to be described. Rock lever 11 is rigidly connected to a shaft 57 as by set screw 58. This lever 11 comprises a single arm extending to the left as viewed in Figs. 1 and 3.

The shaft 57 is given oscillatory rotary motion, for example, in the same way and by the same mechanism as is the corresponding shaft 121 of the aforesaid Gardinor, et al. Patent No. 2,647,581 from a cam 59 mounted on shaft 47. This cam 59 in turn operates a spring urged lever 60 on shaft 50. The lever 60 is connected by a link (not shown) to a rock bell crank lever (not shown) fixed to shaft 57. Thus the latter shaft is oscillated in the same way as the corresponding shaft 121 of said Gardinor, et al. patent.

Rock lever 12 is rotatively mounted on shaft 57. This lever has oppositely directed arms 12*a* and 12*b*, Arm 12*a* is coupled to rock lever 11 by a spring 61. Arm 12*b* extends into a slot 62 in the reverse registration stop 10. Starting from the position of levers 11 and 12 as shown in Fig. 3, as shaft 57 rocks in a counterclockwise direction, rock lever 11 rotates similarly and moves downwardly, pulling lever arm 12*a* of lever 12 after it because of tensioning of coil spring 61, consequently causing lever arm 12*b* to move upwardly and raise the reverse registration stop 10. The elevation of stop 10 moves its upper end portion 14 into the record card movement path as seen in Fig. 1. When rock lever 11 has reached the end of its counterclockwise movement, the corresponding counterclockwise rotation of rock lever 12 is limited either by arrival of the reverse registration stop 10 at its uppermost position, or by engagement of flange 63 on lever arm 12*a* with the upper edge 64 of rock lever 11. The spring 61 is necessary to provide a yielding coupling between levers 11 and 12 so that when cam surface 26 on linkage bar 23 locks the reverse registration stop 10 in inoperative position during normal registration, rock lever 12 which then cannot follow the counterclockwise motion of rock arm 11 will merely cause stretching of said spring 61. When shaft 57 rocks in a clockwise direction, however, it is necessary that positive motion be applied immediately to the reverse registration stop 10 to make certain that the upper portion 14 of the latter will be moved out of the card movement path promptly. It is apparent that during clockwise motion of the shaft the edge 64 of lever arm 11 bears against flange 63 on rock lever arm 12*a* and positively moves it so that lever arm 12*b* moves the reverse registration stop 10 back down into its lowered position.

To return the mechanism to the normal registration position of Fig. 3 the shifting bar 33 is manually pushed to the right as seen in Fig. 3 until its shoulder 36 is positioned to the right locking element 37. The leaf spring 39 urges shoulder 36 of the linkage bar 10 up into locking engagement behind the bar 37. The spring 28 then cannot again shift the linkage bar 23 leftward until the release member 35 is again depressed by the operator.

In general, therefore, it will be seen that the registration means of this invention provides an arrangement for registering cards properly relative to a punching station either when the cards are fed to the machine for normal registration or when the cards are fed to it for reverse registration. The means include a card pusher 42 acting on the trailing end of the card to advance it toward the punching station in either condition and in addition include an abutment stop 10 that is interposed in the path of travel of the cards toward the punching station when they are fed to the latter for reverse registration. The pusher 42 advances the cards in normal registration condition to a first determined position relative to the punching station B. The pusher 42 in cooperation with the abutment stop member 10 advances the cards in reverse registration condition to a second determined position relative to the punching station B. Means are also associated with the registration device of this invention to control changeover from one kind of card registration to the other by operation of a simple manual shifting arrangement. Means are thus provided to insure accurate card registration relative to the punching station with either normal or reverse card advancement.

While a specific embodiment of the invention has been described and shown, variations in structural detail within the scope of the appended claims are possible and are contemplated. There is no intention, therefore, of limitation to the exact details shown and described.

What is claimed is:

1. In a record card punching machine, reciprocally movable card pusher means for advancing a card toward a punching station, reciprocally movable abutment means engageable in one position with said card to limit the extent of advance of said card toward said station by said pusher means, means for reciprocating said abutment means, means for locking said abutment means in a non-engaging position relative to said card, and means coupled to said locking means for controlling the advancing movement of said card pusher means.

2. In a record card punching machine, reciprocally movable card pusher means for advancing a card toward a punching station, cam means for reciprocating said card pusher means, reciprocally movable abutment means engageable in one position with said card to limit the extent of advance of said card toward said station by said pusher means, means for reciprocating said abutment means, means for locking said abutment means in a non-engaging position relative to said card, limiting means coupled to said locking means for controlling the card advancing movement of said pusher means, and means for releasing said locking means.

3. In a record card punching machine, reciprocally movable card pusher means for advancing a card toward a punching station, cam means for reciprocating said card pusher means, reciprocally movable abutment means engageable in one position with said card to limit the extent of advance of said card toward said station by said pusher means, means for reciprocating said abutment means, means for locking said abutment means in a non-engaging position relative to said card, limiting means coupled to said locking means for controlling the card advancing movement of said pusher means, linkage means coupling said locking means to said limiting means, spring means connected to said linkage means for biasing the latter and said locking means toward a non-locking position of said locking means, catch means for maintaining said locking means in a locking position, and means for releasing said catch means.

4. In a record card punching machine, reciprocally movable card pusher means for advancing a card toward a punching station, reciprocally movable abutment means engageable in one position with said card to limit the extent of advance of said card toward said station by the card pusher means, rocker means for reciprocating said abutment means and including an oscillating lever mounted on a rocking shaft, a second lever rotatively supported on said shaft and engaging said abutment means, spring means coupling said levers, and means for locking said abutment means in a non-engaging position relative to said card, said second lever acting while said abutment means is unlocked to reciprocate the latter, and said spring means permitting said second lever to yield whenever said abutment means is locked in its non-card-engaging position.

5. In a record card punching machine, a reciprocally movable card pusher means for advancing a card toward a punching station, said pusher means including a card pusher arm, a pivoted support for said arm, cam means for reciprocating said arm about said support so that an end portion of said arm is movable toward and away from said punching station, said end portion in its movement toward said punching station pushing against the trailing edge of said card to advance said card toward said punching station, a reciprocally movable abutment means engageable in one position with said card to limit the extent of advance of said card toward said station by said pusher arm, means for reciprocating said abutment means, means for locking said abutment means in a non-engaging position relative to said card, and means coupled to said locking means for controlling the extent of advancing movement of the card effected by said card pusher arm.

6. In a record card punching machine, reciprocally movable card pusher means for advancing a card toward a punching station, a card abutment member reciprocally movable into stopping engagement with the leading edge of said card to limit the advance of said card toward said punching station by said card pusher means, rocker means for reciprocating said abutment member into and out of position for stopping engagement with said card, locking means for retaining said abutment member in a non-engaging position with respect to said card, and means coupled to said locking means for controlling the extent of advancing movement of the card effected by said card pusher means.

7. In a record card punching machine for step-by-step binary code punching of oblong record cards in columns along the width of said cards, said machine having a card supply from which said cards are automatically fed one at a time along a predetermined path to a card punching station, card alignment means located along said path for automatically positioning each advancing record card with respect to said station, said alignment means comprising a reciprocally movable card pusher arm, a pivotal support for said arm, means for reciprocating said arm about said support so that an end portion of said arm is movable toward and away from said station, said end portion in its movement toward said station pushing against the trailing edge of said card to advance it towards said station, an upright card abutment member slideably supported below said path for vertical movement into and out of said path at a fixed distance from said station, rocking means for momentarily moving said member into said path and into stopping relationship with the leading edge of said card, and for thereafter withdrawing said member from said path to permit further advance of said card with respect to said station, latch means movable from a release position into a locking position with respect to said member, stop limit means movable from a first movement limiting position with respect to said arm into a second movement limiting position with respect thereto, linkage means coupling said latch means and said stop limit means so that when said latch means is in its release position said stop limit means is in its first movement limiting position and when said latch means is in its locking position said stop limit means is in its second movement limiting position, and means to operate said linkage means to move said latch means and said stop limit means together.

8. In a record card punching machine having a card supply from which record cards are automatically fed one at a time along a predetermined path to a card punching station, a card alignment means located along said path for automatically positioning each advancing record card with respect to said station, the progression of said card from said alignment means to said station being at right angles to the progression of said card from said supply to said alignment means, said alignment means comprising a reciprocally movable card pusher arm, a pivotal support for said arm, means for reciprocating said arm about said support so that an end portion of said arm is movable toward and away from said station, said end portion in its movement toward said punching means pushing against the trailing edge of said card to advance it towards said station, a card abutment plate slideably supported below said path for vertical movement into and out of said path at a fixed distance from said station, rocking means for momentarily moving said plate into said path into stopping relationship with the leading edge of said card, and for thereafter withdrawing said plate from said path to permit further advance of said card with respect to said station, latch means movable from a release position into a locking position with respect to said plate, stop limit means movable from a first movement limiting position with respect to said arm into a second movement limiting position with respect thereto, linkage means coupling said latch means and said stop limit means so that when said latch means is in its release position said stop limit means is in its first movement limiting position, and so that when said latch means is in its locking position said stop limit means is in its second movement limiting position, one desired alignment of said card with respect to said station being attainable in said first movement limiting position by the cooperative action of said arm and said plate in locating the leading edge of said card a fixed distance from said station, and another desired alignment of said card with respect to said station being attainable in said second movement limiting position by the action of said arm in pushing the trailing edge of said card to a different fixed distance from said station, and means to operate said linkage means to move said latch means and said stop limit means together.

9. In a record card punching machine having a card supply from which cards are automatically fed one at a time by card advancing means along a predetermined path to a card punching station, a card alignment means located along said path for automatically positioning the punching area of each record card with respect to said station, said alignment means including a card pushing means for pushing said card along said predetermined path toward said station, card abutting means for stopping the advancement of said card toward said station by said pushing means, latch means movable from a release position into a locking position with respect to said abutting means, stop limit means movable from a first movement limiting position with respect to said pushing means into a second movement limiting position with respect thereto, linkage means coupling said latch means and said stop limit means so that when said latch means is in its release position said stop limit means is in its first movement limiting position and when said latch means is in its locking position said stop limit means is in its second movement limiting position, means for automatically operating said pushing means and said abutting means, and means to operate said linkage means to move said latch means and said stop limit means together.

10. In a record card punching machine having a card supply from which cards are automatically fed one at a time by card advancing means along a predetermined path to a card punching station, a card alignment means located along said path for automatically positioning the punching area of each record card with respect to said station, said alignment means including a card pushing means for pushing said card along said predetermined path toward said station until the trailing edge of said card is located a predetermined distance from said station, card abutting means for stopping the advancement of said card toward said station by said pushing means to locate the leading edge of said card a predetermined distance from said station, limiting means for stopping the movement of said pushing means toward said station, said limiting means movable from one limiting position farther from said station to a second limiting position nearer to said station, latch means for selectively activating said abutting means, linkage means coupling said limiting means and said latch means to permit simultaneous operation of both said means, and means for automatically operating said pushing means and said abutting means.

References Cited in the file of this patent

UNITED STATES PATENTS

| | | |
|---|---|---|
| 2,074,720 | Eckhard | Mar. 23, 1937 |
| 2,114,108 | Hormel | Apr. 12, 1938 |
| 2,480,192 | Laxo | Aug. 30, 1949 |